United States Patent
Keschwari-Rasti

[11] Patent Number: 5,419,620
[45] Date of Patent: May 30, 1995

[54] DEVICE FOR ADJUSTING THE BRAKING FORCE AT BRAKE DISKS FOR RAILBORNE VEHICLES

[75] Inventor: Mahmud Keschwari-Rasti, Barsinghausen, Germany

[73] Assignee: Mannesmann Aktiengesellschaft, Dusseldorf, Germany

[21] Appl. No.: 221,691

[22] Filed: Mar. 31, 1994

[30] Foreign Application Priority Data

Mar. 31, 1993 [DE] Germany .......... 43 11 017.7

[51] Int. Cl.⁶ .......... B60T 8/00; B60T 13/66; G01L 1/00; G05D 15/01
[52] U.S. Cl. .......... 303/3; 188/1.11; 188/181 T; 303/20; 303/112
[58] Field of Search .......... 303/2-3, 303/112, 100, 20, 7, 9.61, 13, 16, 18, DIGS. 1-4; 188/181 T, 1.11, 58, 59, 181 C, 153, 196 R, 71.8, 79.51

[56] References Cited

U.S. PATENT DOCUMENTS 4,790,606  12/1988  Reinecke .......... 303/20 X
4,805,740  2/1989   Wilke et al. .......... 188/1.11 X
5,312,168  5/1994   Breen .......... 303/3 X Primary Examiner—Douglas C. Butler
Attorney, Agent, or Firm—Cohen, Pontani, Lieberman, Pavane

[57] ABSTRACT

A device for adjusting the braking force in railborne vehicles, for trains combining railborne vehicles of more recent and older construction. The braking signal, which can be switched pneumatically via a main air line is transmitted to the brake control by a PU converter connected to the main air line rather than transmitting the braking signal via the vehicle bus.

5 Claims, 1 Drawing Sheet

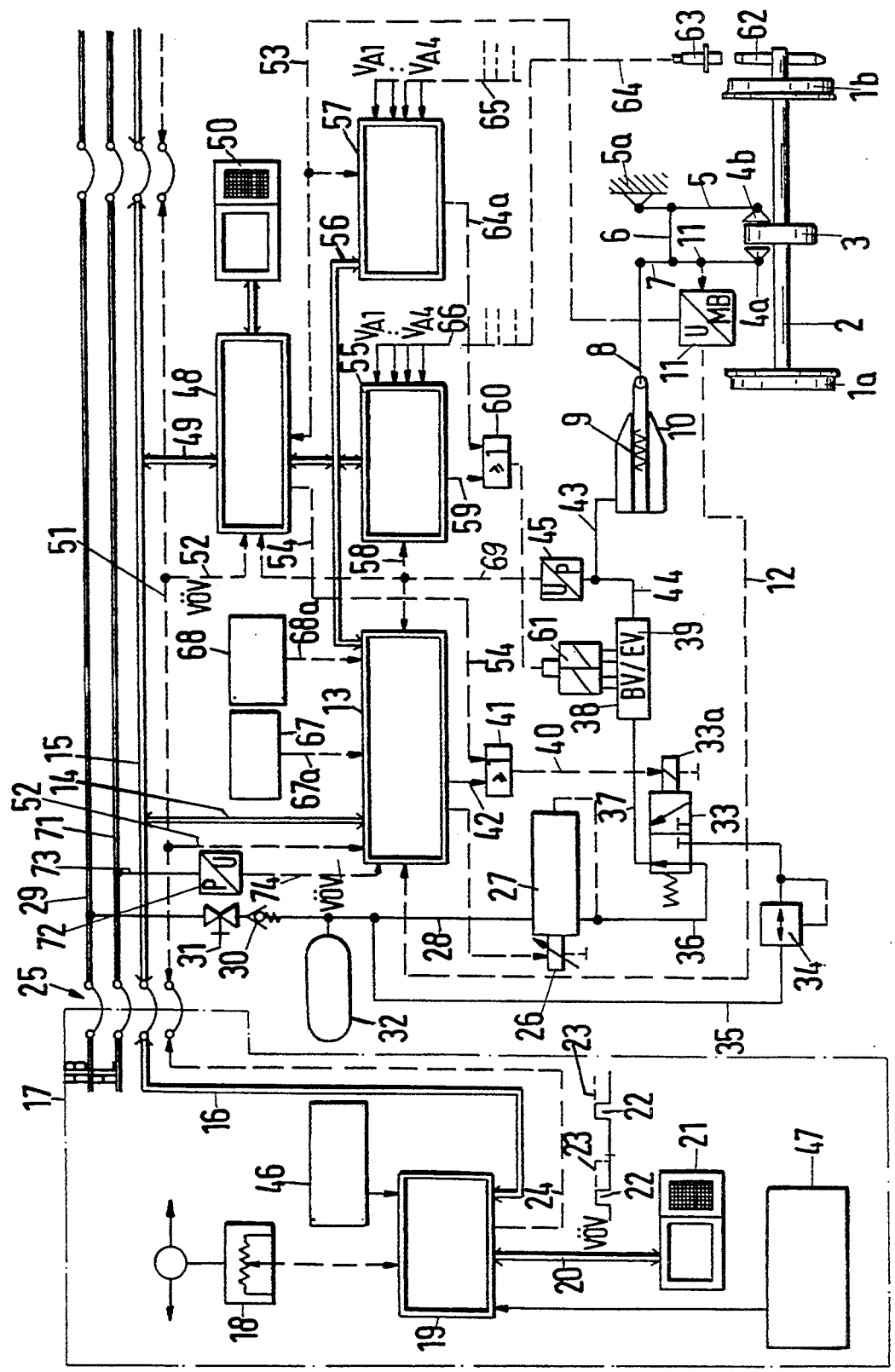

DEVICE FOR ADJUSTING THE BRAKING FORCE AT BRAKE DISKS FOR RAILBORNE VEHICLES

BACKGROUND OF THE INVENTION

The application is directed to a device for adjusting the braking force in railborne vehicles in which a main-tank air line associated with each railborne vehicle is guided via a controllable and/or adjustable valve system to a brake cylinder which is provided with a slack adjuster and whose brake rod linkage, which is connected to a piston rod, cooperates by means of two oppositely acting brake shoes with a brake disk fastened to the axle of the pair of wheels, wherein reference value signals can be supplied via a vehicle bus and/or a pulse-width control to a brake control for processing and the brake control signals can be switched to the valve system via lines. A braking torque receiver for measuring elongation forces, tensile forces or bending forces and converting them into an electrical measurement signal is arranged in the brake rod linkage. The measurement signals can be transmitted to the brake control and are comparable with reference value signals of a reference value potentiometer obtained via the vehicle bus, and the difference value reference signal can be transmitted to the brake cylinder via the valve system for changing the braking torque at the pair of brake shoes.

The object of achieving not only more accurate measurements for the braking force, but also, at the same time, enabling a correction of a braking force deviating from the reference value is accordingly met.

Such a device, in and of itself, is provided for railborne vehicles with a vehicle bus. However, it is not possible to apply such complete devices in older types of vehicles.

In order for a brake force adjusting device as described above to be used for trains forming so-called mixed or combined transport, i.e. railborne vehicles of more recent and older constructions, it is necessary to transmit the braking signal to the brake control in a different manner.

SUMMARY OF THE INVENTION

Accordingly, the object of the present invention is to provide a device for adjusting the braking force for railborne vehicles which do not have their own vehicle bus.

Pursuant to this object, and others which will become apparent hereafter, one aspect of the present invention resides in transmitting the braking signal, which can be switched pneumatically via a main air line, to the brake control by means of a PU converter connected to the main air line. The advantage of this construction is that the device of the invention can be applied not only to railborne vehicles with more up-to-date production specifications, but also to older railborne vehicles so that the older railborne vehicles can be outfitted with this system.

In another embodiment of the invention a PU converter is connected by means of a compressed air line or by means of electrical lines to the brake control in each individual vehicle.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

The single FIGURE shows a functional/block diagram of the overall device pursuant to the present invention.

DETAILED DESCRIPTION OF THE PREFERRED EMBODIMENTS

As can be seen in the drawing, a pair of wheels 1a, 1b running on rails is supported on an axle 2 that also carries brake disks 3. A pair of brake shoes 4a, 4b, which is articulated at a piston rod 8 by means of a brake rod linkage 5 with a cross rod 6 and a two-armed lever 7, act symmetrically on the lateral surfaces of the brake disk 3. The piston rod 8 also receives a rod linkage adjusting means or slack adjuster 9 which eliminates play in the brakes. The piston rod 8 and the slack adjuster 9 are guided in a brake cylinder 10. A braking torque receiver 11 which, e.g., converts a force (elongation force, tensile force, bending force, compressive force and the like) into an electrical signal is connected inside the brake rod linkage 5. The braking torque receiver 11 which is, for example, a wire strain gauge is connected to a brake control 13 via a connection 12.

The brake control 13 communicates via a connection bus 14 with a vehicle bus 15 which can be coupled to the data bus 16 of a driver's cabin 17, e.g. in a locomotive.

In addition to a reference value potentiometer 18, the driver's cabin 17 has diagnostic electronics 19 connected with the data bus 16 and a monitor 21 connected via another data bus 20. The reference value signals of the reference value potentiometer 18 are conveyed from the electronic diagnostic device 19 via a second redundant connection 24 (dashed line) as a pulse-width control 22, pulse-width change 23 via a coupling 25 to the brake control 13 and from there to an electromagnet 26 of a proportional valve 27. The proportional valve 27 is connected by a line 28 to a main-tank air line 29 with the intermediary of a check valve 30, a shut-off valve 31, and a supply tank 32.

A directional valve 33 is connected to the line 28 with the intermediary of an emergency pressure valve 34 via a line 35. From the directional valve 33, a line 36 is guided to the proportional valve 27 and a line 37 is guided to an aeration valve 38 and an air-relief valve 39. Further, a third connection 40 provides a signal connection between an electromagnet 33a of the directional valve 33 and a logic element 41 which cooperates with the brake control 33 via a fourth connection 42 providing a signal connection.

The brake cylinder 10 is then connected by a line 43 and a line 44 with a pressure converter 45. In the device, as described thus far, the braking torque receiver 11 connected in the brake rod linkage 5 (or in the two-armed lever 7) measures the actual braking force. The measured braking force is compared with the reference braking force of the reference value potentiometer 18 in the brake control 13, and the pressure in the brake cylinder 10 is changed, i.e. increased or reduced, in conformity to the difference value determined for the pressure in the brake cylinder 10. In the event of excess braking force, the brake cylinder pressure is reduced until the adapted brake cylinder pressure corresponds to the actual static coefficient of friction between the wheel 1a, 1b and the rail.

Further, additional functions 46 such as emergency braking, target braking, automatic driving and braking control, continuous automatic train running control, change of train type, load-dependent braking, rapid braking, magnetic rail braking, brake acceleration, release acceleration, and the like are provided in the driver's cabin 17 in the electronic diagnostic device 19. Moreover, the actual movement parameters can be supplied to and processed in the electronic diagnostic device 19 via a device 47.

A diagnostic system 48 for an additional connection bus 49 is connected to the data flow at the vehicle bus 15 along with a second monitor 50. The diagnostic system 48 is further connected to the vehicle bus 15 which can be coupled to the second connection 24. Moreover, a signal line 52 for the pulse-width control 22 (VÖV [Public Transportation Association] signals concerning a preset braking value) runs from the vehicle connection 51. The diagnostic system 48 checks all of the peripheral equipment and directs the signal values to the driver's cabin 17 via the vehicle bus 15. The signal line 52 is also guided from the vehicle connection 51 to the brake control 13.

The diagnostic system 48 also receives signals from the braking torque receiver 11 via a fifth connection 53 and transmits signals to the logic element 41 via a sixth connection 54. As an additional system, an anti-skid device 55 is connected with the brake control 13, the diagnostic system 48 and a roll monitoring device 57 via a mini-data bus 56. Moreover, the anti-skid device 55 is connected directly with the brake control 13 by means of a line 58 and with the diagnostic system 48. Further, a line 59 leads to another logic element 60 which controls an electromagnet 61 of the aeration valve 38 and air-relief valve 39.

An additional logical element line 64a is guided from the roll monitoring device 57 to the logic element 60.

Actual driving data are guided from a magnet wheel or pole wheel 62 mounted on the axle 2 and from a pulse generator 63 to the anti-skid device 55 and at the same time to the roll monitoring device 57 by means of a signal line 64 via branch lines 65 and 66.

Furthermore, a direct connection from load detecting means 67 to the brake control 13 is produced via a line 67a. Another direct connection is produced from a brake type detector 68 via one or more lines 68a.

The diagnostic system 48 is further provided with signals of the pressure converter 45 via a control line 69, these signals being guided via line 58 to the anti-skid device 55.

Additional outfitting of older railborne vehicles consists in that the braking signal which can be switched pneumatically via a main air line 71 can be transmitted to the brake control 13 by means of a PU converter 72 connected to the main air line 71. The PU converter 72 which is connected by means of a compressed air line 73 is connected to the brake control 13 in each individual railborne vehicle by means of electric lines 74.

The invention is not limited by the embodiments described above which are presented as examples only but can be modified in various ways within the scope of protection defined by the appended patent claims.

I claim:

1. A device for adjusting braking force in railborne vehicles having pairs of wheels and in which a main-tank air line is associated with each railborne vehicle, comprising:

a brake disk fastened to an axle of a pair of wheels;
   a brake cylinder having a brake rod linkage;
   a valve system that connects the main-tank air line to the brake cylinder;
   two oppositely acting brake shoes arranged at the brake disk and connected to the brake cylinder so that the brake cylinder can actuate the brake shoes to contact the brake disk;
   braking torque receiver means for measuring one of elongation forces, tensile forces and bending forces and convening them into an electrical measurement signal, the braking torque receiver means being arranged in the brake rod linkage;
   a reference value potentiometer;
   brake control means for comparing the reference value signals from the potentiometer with the measurement signals to determine a difference valve reference signal that is transmitted to the brake cylinder by the value system for changing braking torque at the brake shoes; and
   a PU converter connected to the main air line for transmitting the braking signal to the brake control means.

2. A device according to claim 1, and further comprising a compressed air line that connects the PU converter to the main air line, wherein for mixed traffic each railborne vehicle has a PU converter connected by means of a compressed air line to the brake control means.

3. A device according to claim 1, wherein, for mixed traffic, each railborne vehicle has a PU converter connected to the brake control means by electric lines.

4. A device according to claim 1, wherein the valve system is at least one of controllable and adjustable.

5. A device according to claim 1, wherein the brake cylinder includes a slack adjuster and a piston rod connected to the brake rod linkage.

* * * * *